United States Patent
Kemmer et al.

(10) Patent No.: US 11,228,045 B2
(45) Date of Patent: Jan. 18, 2022

(54) DISTRIBUTION STRUCTURE FOR PROVIDING AT LEAST ONE REACTION GAS

(71) Applicant: Robert Bosch GmbH, Stuttgart (DE)

(72) Inventors: Helerson Kemmer, Vaihingen (DE); Jan Hendrik Ohs, Renningen (DE); Kai Weeber, Heimsheim (DE); Stefan Schoenbauer, Ditzingen (DE); Ulrich Berner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 16/634,219

(22) PCT Filed: Jun. 20, 2018

(86) PCT No.: PCT/EP2018/066404
§ 371 (c)(1),
(2) Date: Jan. 27, 2020

(87) PCT Pub. No.: WO2019/020284
PCT Pub. Date: Jan. 31, 2019

(65) Prior Publication Data
US 2021/0075028 A1    Mar. 11, 2021

(30) Foreign Application Priority Data
Jul. 26, 2017   (DE) .................... 10 2017 212 846.1

(51) Int. Cl.
*H01M 8/026* (2016.01)
*H01M 8/2483* (2016.01)
(Continued)

(52) U.S. Cl.
CPC .............. *H01M 8/026* (2013.01); *C25B 1/04* (2013.01); *C25B 11/00* (2013.01); *H01M 8/006* (2013.01);
(Continued)

(58) Field of Classification Search
CPC ..... H01M 8/026; H01M 8/2483; H01M 8/006
See application file for complete search history.

(56) References Cited

U.S. PATENT DOCUMENTS 5,939,218 A * 8/1999 Mizuno ............. H01M 8/04649
429/432
2002/0132156 A1 * 9/2002 Ruhl ..................... H01M 8/025
429/444

(Continued)

FOREIGN PATENT DOCUMENTS

DE   102007042985   3/2009
DE   102013212180   12/2014

(Continued)

OTHER PUBLICATIONS

International Search Report for Application No. PCT/EP2018/066404 dated Aug. 23, 2018 (English Translation, 3 pages).

*Primary Examiner* — Olatunji A Godo
(74) *Attorney, Agent, or Firm* — Michael Best & Friedrich LLP

(57) ABSTRACT

The invention relates to a distribution structure (10) for providing at least one reaction gas, in particular a gas mixture containing oxygen (O2), for a fuel cell (100) or an electrolyser, having a first structure element (11) and a second structure element (12), wherein the first structure element (11) and the second structure element (12) are designed and arranged with respect to one another such that: a distribution area (15) for the reaction gas is formed between the first structure element (11) and the second structure element (12); a plurality of feed channels (16) branch off from the distribution area (15) and are orientated substantially perpendicular to the distribution area (15); and a plurality of discharge channels (17) are formed below the second structure element (12) and are orientated parallel to the distribution area (15).

16 Claims, 2 Drawing Sheets

(51) Int. Cl.
*C25B 1/04* (2021.01)
*C25B 11/00* (2021.01)
*H01M 8/00* (2016.01)
*H01M 8/0206* (2016.01)
*H01M 8/04082* (2016.01)
*H01M 8/1018* (2016.01)

(52) U.S. Cl.
CPC ..... *H01M 8/0206* (2013.01); *H01M 8/04082* (2013.01); *H01M 8/2483* (2016.02); *H01M 2008/1095* (2013.01)

(56) References Cited

U.S. PATENT DOCUMENTS

| | | | |
|---|---|---|---|
| 2004/0096726 | A1 | 5/2004 | Takahashi |
| 2007/0116996 | A1* | 5/2007 | Pavlik ................ H01M 8/2457 429/422 |
| 2011/0281193 | A1 | 11/2011 | Levesque et al. |
| 2012/0122008 | A1 | 5/2012 | Ko et al. |
| 2012/0301806 | A1 | 11/2012 | Okabe |

FOREIGN PATENT DOCUMENTS

| | | |
|---|---|---|
| DE | 102013216587 | 2/2015 |
| DE | 102016213057 | 1/2018 |
| JP | S6358769 A | 3/1988 |
| JP | 2006324084 A | 5/2005 |
| JP | 2006049177 A | 2/2006 |
| JP | 2009064772 A | 3/2009 |
| JP | 2012064385 A | 3/2012 |

\* cited by examiner

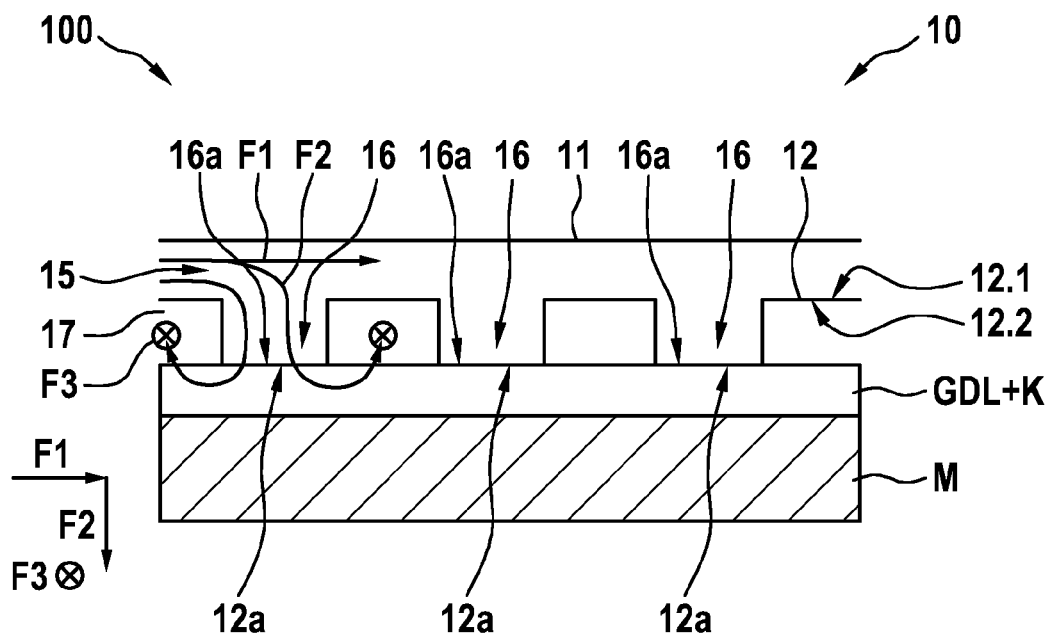
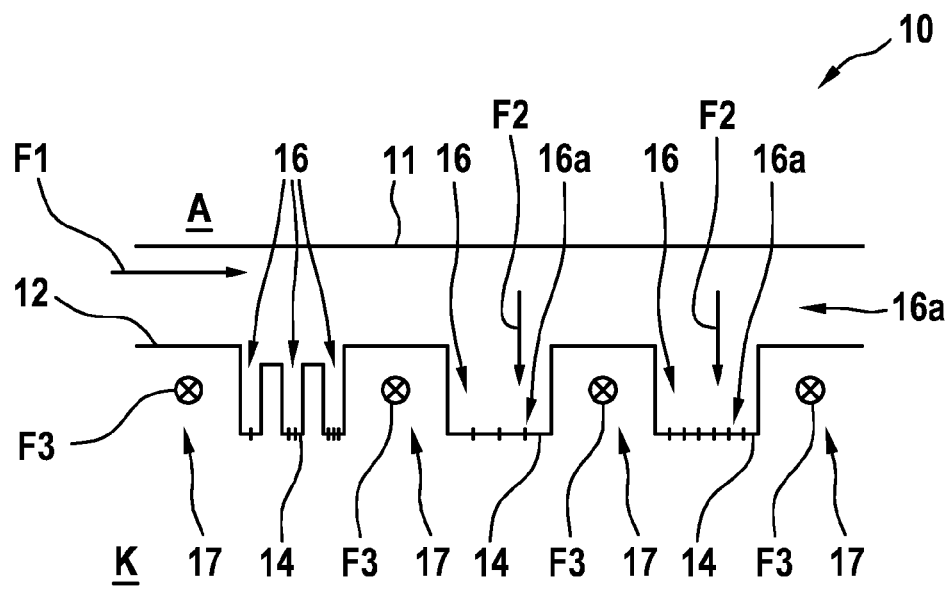

DISTRIBUTION STRUCTURE FOR PROVIDING AT LEAST ONE REACTION GAS

BACKGROUND OF THE INVENTION

The invention relates to a distribution structure for supplying at least one reaction gas, in particular an oxygen-containing gas mixture, for a fuel cell or an electrolyzer. Furthermore, the invention relates to a fuel cell or an electrolyzer, for example having a polymer membrane for the transport of protons or hydroxide ions.

Fuel cells and electrolyzers are electrochemical energy converters. In the case of fuel cells, hydrogen and oxygen, for example, are converted into water, electric energy and heat. In the case of electrolyzers, water is, for example, conversely split into hydrogen and oxygen by means of an electric current. A plurality of fuel cells can also be assembled to form a stack. The starting materials, comprising hydrogen, oxygen in the case of fuel cells and water in the case of electrolyzers, and also cooling liquid are fed via a distribution structure into each cell. This distribution structure forms channels for the starting materials and cooling liquid. The distribution structure performs the following functions: distribution of the starting materials uniformly over an active surface of the fuel cell or the electrolyzer; conduction of the electrons into the next cell; discharge of the product water (fuel cell) and product gases (electrolyzer) from the cell; and also conduction of the heat from the catalyst layer to the coolant. Known distribution structures are configured as embossed metallic sheets which by means of webs and furrows form a channel structure (bipolar plates). In the case of fuel cells, the reaction gases are distributed over the electrochemically active surface by means of the channel structure. However, there is no gas flow underneath the webs. Under these webs of the bipolar plates, liquid product water can accumulate on a cathode side (especially in the case of high current densities) and this water blocks the pores within the catalyst layer. The oxygen transport to the catalyst layer is locally greatly inhibited thereby, so that the performance of the cell breaks down locally, with the result that the overall performance of the cell is impaired.

SUMMARY OF THE INVENTION

The present invention provides a distribution structure for supplying at least one reaction gas, in particular an oxygen-containing gas mixture, for a fuel cell or an electrolyzer and a fuel cell or an electrolyzer, for example having a polymer membrane for the transport of protons or hydroxide ions. Further advantages, features and details of the invention can be derived from the dependent claims, the description and the drawings. Here, features and details which have been described in connection with the distribution structure of the invention of course also apply in connection with the fuel cell of the invention or the electrolyzer of the invention and vice versa, so that interchangeable reference will or can always be made to the individual aspects of the invention in the disclosure.

The invention provides a distribution structure for supplying at least one reaction gas, in particular an oxygen-containing gas mixture, for a fuel cell or an electrolyzer, which distribution structure is configured with a first structural element and a second structural element, where the first structural element and the second structural element are configured and arranged relative to one another in such a way that a distribution area for the reaction gas is formed between the first structural element and the second structural element, that a plurality of feed channels which are oriented essentially perpendicular to the distribution area are branched off from the distribution area and that a plurality of discharge channels which are oriented parallel to the distribution area are formed underneath the second structural element.

The idea underlying the invention is that a flat distribution area is provided between two structural elements, for example made of metallic sheets, through which distribution area the at least one reaction gas is distributed uniformly and with a low pressure drop over a total active surface of a fuel cell or of an electrolyzer in order to optimize the efficiency. The distribution area can be arranged parallel to the plane of extension of the fuel cell or of the electrolyzer. Furthermore, the distribution area is configured with a plurality of feed channels which branch off from the distribution area and through which the reaction gas is introduced perpendicular to the active surface into a gas diffusion layer. The discharge of the product water formed can also be ensured in this way.

Column-like or line-like connecting pieces between two structural elements can ensure electrical contact and mechanical stability while only inhibiting free flow to a minimal extent.

Dimples, for example in the form of depressions having different, e.g. rectangular or circular, cross sections, and/or grooves are embossed at regular or varying intervals into the lower or second structural element which can be brought to rest against the gas diffusion layer with an applied catalyst layer. The dimples and/or grooves form the feed channels which are oriented essentially perpendicular to the distribution area. The feed channels can be provided on the underside with one or more holes. As a result, air branches off from the distribution area into the feed channels and escapes through the holes into the underlying gas diffusion layer and catalyst layer in which the electrochemical reaction takes place.

The product gas and/or the product water is discharged parallel to the distribution area or parallel to the plane of extension of the gas diffusion layer from the cell via the open spaces between the feed channels underneath the second structural element or between the gas diffusion layer and the second structural element.

Thus, two structural elements form two separate channel structures for the reaction gas and for the product gas, so that the reaction gas and the product gas are hydrodynamically separated from one another.

From the other side of the fuel cell or the electrolyzer, a second distribution structure having a desired shape can be realized for the second reaction gas.

A number of advantages are achieved by means of such a two-part distribution structure for the (preferably oxygen-containing) reaction gas. Firstly, the gas fed in is distributed uniformly over the total active surface of the fuel cell or the electrolyzer by means of the distribution area, preferably with a low pressure drop. The active surface is thus supplied point-by-point with fresh gas (reaction gas). In contrast to known bipolar plates, the gas concentration does not decrease from inlet to outlet but instead the entire active surface is supplied point-by-point with fresh gas. A uniform supply of fresh gas through all feed channels is achieved as a result of the pressure drop within the distribution area being significantly smaller than the pressure drop through the feed channels. Secondly, the total pressure drop in the distribution structure of the invention from inlet to outlet is small since only a small part of the total gas introduced flows through each dimple.

In addition, accumulation of liquid water under the webs of the second structural element is reliably prevented by the distribution structure of the invention since in the construction according to the invention the gas flow flows through the bottom of the feed channels and thus through the contact area between the distribution structure and the gas diffusion layer. The discharge of the liquid water is thus ensured and the webs of the second structural element are not flooded with liquid water.

A further advantage is the introduction of gas perpendicular to the active surface. Convective gas transport into the catalyst layer through to the active centers of the active surface thus occurs. In the case of conventional bipolar plates, the gas flows parallel to the active surface and the transport of gas to the catalyst layer occurs purely by diffusion. Convective gas transport can be made more uniform and controllable over the total active surface than transport of gas by diffusion.

In order to achieve optimized flow conditions, the configuration of the feed channels can also vary along the active surface or along the distribution area. Firstly, the feed channels can have fewer holes or perforations or perforations having smaller diameters at the inlet than at the outlet. Secondly, the entire configuration of the feed channels can vary in respect of width and/or shape.

It is also conceivable for a fan, for example in the form of a suction fan, to be provided in order to draw off the exhaust gas underneath the second structural element or between the second structural element and the gas diffusion layer.

Furthermore, the invention can provide for the first structural element to be configured in the form of a flat plate element. Such a first structural element is simple and inexpensive but brings a number of advantages including separation of the space between the flat first structural element and the second structural element in order to distribute the reaction gas and between the second structural element and a gas diffusion layer in order to transport away the product gas and/or the product water. It is conceivable here for even known and/or existing bipolar plates to be equipped with such a first structural element by the first structural element being positioned between the plates of the bipolar plate and kept at a distance from the cathode-side plate. The invention can thus be utilized for producing improved distribution structures and for modification of known distribution structures. The performance during operation of the fuel cell or the electrolyzer can be considerably increased by means of such improved or modified distribution structures.

Furthermore, the invention can provide for the second structural element to be configured in the form of a plate element which is embossed and/or stamped and/or perforated at least in regions. Such a structural element is likewise simple and inexpensive to produce. The feed channels oriented essentially perpendicular to the active surface can be provided by means of such a second structural element. Once again, the reaction gas is thereby supplied perpendicularly to the active surface. The distribution of the reaction gas can thus be carried out convectively and thus in a targeted, controlled and uniform manner over the entire active surface.

Furthermore, at least one electrically conductive, in particular column-like, connecting element can, for the purposes of the invention, be provided between the first structural element and the second structural element. In this simple way, electric contact for conduction of electrons and thermal contact for conduction of the waste heat between the lower second structural element and the upper first structural element can be ensured. A further distribution structure, essentially of any form, for a second reaction gas can be provided above the first structural element. Furthermore, a channel structure for a cooling liquid can be provided between the first structural element of the distribution structure of the invention for the first (for example oxygen-containing) reaction gas and the further distribution structure for the second (for example fuel-containing) reaction gas.

In addition, it is conceivable for the second structural element to have a dimpled and/or grooved structure in order to produce an alternating contact area to a gas diffusion layer at the bottom of the feed channels. A dimpled and/or grooved structure can be produced simply and inexpensively, for example by embossing of a metal sheet. The dimples can also be distributed in an alternating manner, preferably periodically, in both directions of extension of the second structural element. The dimples can have different shapes, for example the shapes of a parallelepiped, cylinder or semicircle.

In addition, it can be provided in the context of the invention for the feed channels to be formed on a first side of the second structural element which faces the first structural element, wherein the discharge channels are formed on a second side of the second structural element which can face a gas diffusion layer. This makes it possible for the reaction gas to be passed through channels which are hydrodynamically separated from channels through which the exhaust gas or product gas is transported away. This can in turn give the advantage that the product water is not mixed with the gas stream of the fresh reaction gas. The humidity of the gas stream of the fresh reaction gas and of the exhaust gas can thus be monitored and/or controlled more easily and more foreseeably. A separate exhaust gas conduit for the discharge channels can be provided through the distribution area of the invention in addition to a cathode conduit. In addition, it is conceivable for a fan, for example in the form of a suction fan, to be provided at the outlet of the separate exhaust gas conduit.

Furthermore, the invention can provide for at least one hole in the second structural element, through which the reaction gas can be introduced essentially perpendicular to a plane of extension of a gas diffusion layer into the gas diffusion layer, to be formed on the bottom of the feed channels. In this way, a Venturi effect in the direction perpendicular to an active surface can also be exploited on passage through the hole in addition to the convective introduction of the reaction gas through the feed channels, so as to equalize and promote the distribution of the reaction gas.

It is also conceivable according to the invention for the feed channels to have an increasing cross-sectional area in the direction of an introduction of reaction gas through the distribution area. This can ensure that a uniform distribution of the reaction gas over the entire distribution area can be made possible from inlet to outlet, even despite possible pressure drops in the direction of an introduction of reaction gas through the distribution area.

Furthermore, it can be provided in the context of the invention that, from feed channel to feed channel, a variable number of holes or a number of holes which increases in the direction of an introduction of reaction gas through the distribution area is formed on the bottom of the feed channels. The increasing number of holes can make it possible for a uniform amount of reaction gas always to be supplied to the gas diffusion layer despite pressure drops.

It can also be provided in the context of the invention that, from feed channel to feed channel, a plurality of holes having different cross-sectional areas or cross-sectional areas which increase in the direction of an introduction of reaction gas through the distribution area are formed on the bottom of the feed channels. This can likewise counter possible pressure drops in the direction of the introduction of reaction gas.

The invention further provides a fuel cell or an electrolyzer, configured with an anode space and a cathode space, wherein a distribution structure as described above is provided for supplying an oxygen-containing gas mixture to the cathode space. The same advantages as have been described above in connection with the distribution structure of the invention are achieved by means of the fuel cell of the invention or the electrolyzer of the invention.

BRIEF DESCRIPTION OF THE DRAWINGS

The gas distribution structure of the invention and further developments and advantages thereof and the fuel cell or electrolyzer of the invention and further developments and advantages thereof will be illustrated in greater detail below with the aid of drawings. The drawings show, in each case schematically.

DETAILED DESCRIPTION

In the figures, features having the same reference symbols will generally be described only once.

Figure 1:
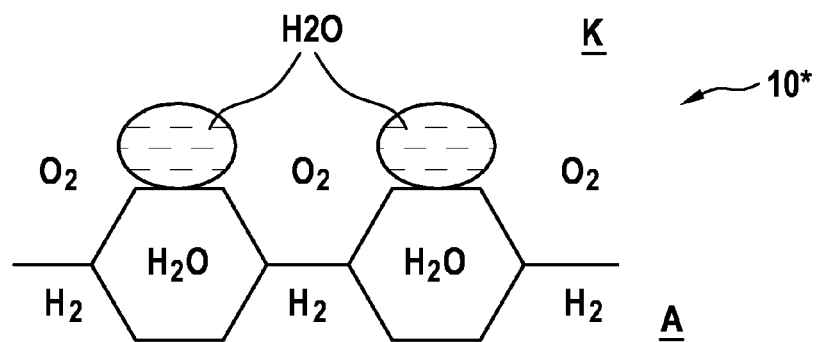
FIG. 1 a schematic construction of a known bipolar plate as a gas distribution structure, FIG. 2 a schematic depiction of a gas distribution structure according to the invention, FIG. 3 a schematic depiction of a fuel cell or an electrolyzer having a gas distribution structure according to the invention, and FIG. 4 a schematic depiction of a gas distribution structure according to the invention as per a further working example.

FIG. 1 shows a known distribution structure 10* in the form of a bipolar plate comprising two embossed metal sheets, for example for a fuel cell 100 or an electrolyzer. A channel structure for a cooling liquid, for example water H2O, is formed between the metal sheets. Above the metal sheets, a first reaction gas, for example an oxygen-containing reaction gas O2, or a second reaction gas, for example a fuel-containing reaction gas H2, is in each case fed to a corresponding adjoining gas diffusion layer GDL. However, in the case of a fuel cell 100 liquid product water H2O collects on the cathode side of the distribution structure 10* at the contact faces between the webs of the bipolar plate and the gas diffusion layer GDL, and this water blocks the pores within the gas diffusion layer GDL. As a result, the transport of oxygen to the catalyst layer is locally greatly inhibited, so that the performance of the fuel cell 100 breaks down locally with the consequence that the total performance of the fuel cell 100 is impaired.

Figure 2:
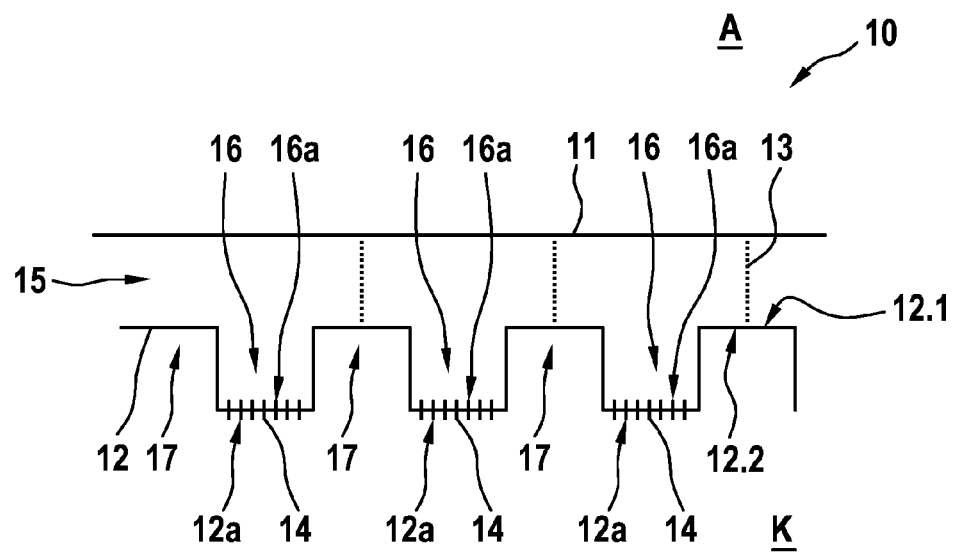

FIG. 2 shows a distribution structure 10 according to the invention for supplying at least one reaction gas, in particular an oxygen-containing gas mixture O2, for a fuel cell 100 or an electrolyzer, which distribution structure is configured with a first structural element 11 and a second structural element 12. According to the invention, the first structural element 11 and the second structural element 12 are configured and arranged relative to one another in such a way that a distribution area 15 for the reaction gas is formed between the first structural element 11 and the second structural element 12, that a plurality of feed channels 16 which are oriented essentially in a direction F2 perpendicular to the distribution area 15 and thus perpendicular to an active surface of the fuel cell 100 or the electrolyzer are branched off from the distribution area 15, and that a plurality of discharge channels 17 which are oriented parallel to the distribution area 15 are formed underneath the second structural element 12. The discharge channels 17 are also oriented in a direction F3 perpendicular to a direction F1 of the introduction of reaction gas through the distribution area 15.

According to the invention, not only one structural element, as shown in FIG. 1, but two structural elements 11, 12 are now provided at least on a cathode side of the distribution structure 10*, as shown in FIG. 2. The reaction gas, preferably oxygen-containing reaction gas O2, is conveyed between the structural elements 11, 12. Between the lower or second structural element 12 and a gas diffusion layer GDL, the discharge channels 17 for transporting away an exhaust gas with product water H2O are formed underneath the second structural element 12. The feed channels 16 and the discharge channels 17 are fluidically separated from one another.

As can clearly be seen from FIG. 3, the reaction gas is distributed by the distribution area 15 which can be arranged parallel to the plane of extension of the fuel cell 100 and is provided with a plurality of feed channels 16 branching off from the distribution area 15. The distribution area 15 and the feed channels 16 are formed between two structural elements 11, 12 according to the invention, for example made of metallic sheets. The reaction gas can in this way be distributed uniformly and with a low pressure drop over the total active surface of the fuel cell 100 or the electrolyzer.

As is indicated in FIG. 2, column-like or line-like connecting elements 13 for electrical contact and mechanical stability can be provided between the structural elements 11, 12 without inhibiting the free flow of the reaction gas through the distribution area 15.

The feed channels 16 can, for example, be embossed in the form of grooves or dimples having different, e.g. rectangular or circular, cross-sectional areas in the second structural element 12. The reaction gas is supplied essentially perpendicular to the active surface of the fuel cell 100 or the electrolyzer through the feed channels 16.

One or more holes 14 through which the reaction gas can escape into the gas diffusion layer GDL are formed on the underside of the feed channels 16. A membrane M through which hydrogen ions are transported adjoins the gas diffusion layer GDL.

Between the depressions for the feed channels 16 underneath the second structural element 12 or between the gas diffusion layer GDL and the second structural element 12, the product gas (electrolyzer) or the product water H2O together with excess gas mixture (fuel cell 100) is discharged parallel to the distribution area 15 or parallel to the plane of extension of the gas diffusion layer GDL from the fuel cell 100 or from the electrolyzer.

Consequently, two separate channel structures for the reaction water H2O (electrolyzer) or the reaction gas (fuel cell 100) and for the product gas (electrolyzer) or the product water H2O together with excess gas mixture (fuel cell 100) are formed by two structural elements 11, 12, so that the starting materials and the products of a corresponding electrochemical reaction are hydrodynamically separated from one another. A second distribution structure, essentially of any form, for example as embossed metal plate, for the second reaction gas, for example the fuel-containing reaction gas H2, can be realized from the other side of the fuel cell 100 or the electrolyzer. Furthermore, a channel structure for a cooling liquid, for example water H2O, can be provided between the first structural element 11 of the distribution structure 10 according to the invention for the first (for example oxygen-containing) reaction gas and the second distribution structure for the second (for example fuel-containing) reaction gas.

The reaction gas fed in is advantageously distributed uniformly over the total active surface of the fuel cell 100 or the electrolyzer by means of the distribution area 15, preferably with a low pressure drop. Branching off therefrom, the active surface is supplied point-by-point with fresh gas (reaction gas). In contrast to known one-piece bipolar plates as shown in FIG. 1, the gas concentration does not decrease from inlet to outlet but instead the entire active surface is supplied point-by-point with fresh gas. A uniform fresh gas supply through all feed channels 16 is achieved by the pressure drop within the distribution area 15 being significantly smaller than the pressure drop through the feed channels 16. Secondly, the total pressure drop in the distribution structure 10 according to the invention from inlet to outlet is small since only a small part of the total gas introduced flows through each feed channel 16.

Accumulation of liquid water under the depressions of the second structural element 12 is reliably prevented by the distribution structure 10 according to the invention since the reaction gas flows directly through the contact areas 12a between the distribution structure 10 and the gas diffusion layer GDL. The liquid water is thus reliably transported away and the depressions of the second structural element 12 are not flooded with liquid water.

A further advantage is the introduction of gas perpendicular to the active surface, as a result of which convective gas transport into the gas diffusion layer GDL can be realized. In the case of bipolar plates as shown in FIG. 1, the reaction gas O2, H2 flows parallel to the active surface and the transport of gas to the catalyst layer occurs purely by diffusion. Convective gas transport as per the invention can advantageously be effected uniformly and in a controlled manner over the entire active surface.

It is conceivable in the context of the invention for a fan or suction fan to be provided in order to draw off the exhaust gas underneath the second structural element 12 or between the second structural element 12 and the gas diffusion layer GDL and thus assist the flow of the exhaust gas through the discharge channels 17.

As FIGS. 1 and 2 show, the first structural element 11 can be configured in the form of a flat plate element. The second structural element 12 can be configured in the form of a plate element which is embossed and/or stamped and/or perforated at least in regions. Such structural elements 11, 12 are simple and inexpensive components. Cheap and simple production of the distribution structure 10 is thus provided.

The feed channels 16 are formed on a first side 12.1 of the second structural element 12 which faces the first structural element 11, with discharge channels 17 being formed on a second side 12.2 of the second structural element 12 which can face the gas diffusion layer GDL. A separate exhaust gas conduit in addition to a cathode conduit through the distribution area 15 according to the invention can be provided for the discharge channels 17. In addition, it is conceivable for a fan, for example in the form of a suction fan, to be provided at the outlet of the separate exhaust gas conduit.

At least one hole 14, preferably a plurality of holes 14, through which the reaction gas can be introduced essentially perpendicular to the plane of extension of the gas diffusion layer GDL into the gas diffusion layer GDL is/are formed in the second structural element 12 at the bottom 16a of the feed channels 16. A Venturi effect in the direction perpendicular to the active surface on passage through the holes 14 in addition to the convective introduction of the reaction gas through the feed channels 16 can thus also be exploited in order to equalize and assist the distribution of the reaction gas.

As FIG. 4 shows, either the holes 14 or the feed channels 16 themselves can have an increasing cross-sectional area in the direction F1 of the introduction of reaction gas in order to make a uniform introduction of the reaction gas into the gas diffusion layer GDL through the distribution area 15 possible despite a possible pressure drop from inlet to outlet. In addition, it is conceivable for a number of holes 14 which increases in the direction F1 of the introduction of reaction gas through the distribution area 15 to be formed, from feed channel 16 to feed channel 16, at the bottom 16a of the feed channels 16.

As is also indicated in FIG. 3, a fuel cell 100 or an electrolyzer which has an anode space A and a cathode space K and is configured with an appropriate distribution structure 10 for supplying the oxygen-containing gas mixture O2 to the cathode space K is provided by the invention.

The above description of FIGS. 1 to 4 describes the present invention exclusively by way of examples. It is of course possible to combine individual features of the embodiments, insofar as it is technically useful, freely with one another without going outside the scope of the invention.

The invention claimed is:

1. A distribution structure for supplying at least one reaction gas for a fuel cell or an electrolyzer, the distribution structure comprising
    a first structural element and a second structural element, wherein the first structural element and the second structural element are configured and arranged relative to one another in such a way that a distribution area for the reaction gas is formed between the first structural element and the second structural element,
    wherein a plurality of feed channels which are oriented essentially perpendicular to the distribution area are branched off from the distribution area, and
    wherein a plurality of discharge channels which are oriented parallel to the distribution area are formed underneath the second structural element,
    wherein the plurality of feed channels and the plurality of discharge channels are alternately arranged.

2. The distribution structure as claimed in claim 1, characterized in that the first structural element is configured in the form of a flat plate element.

3. The distribution structure as claimed in claim 1, characterized in that the second structural element is configured in the form of a plate element which is embossed and/or stamped and/or perforated at least in regions.

4. The distribution structure as claimed in claim 1, characterized in that at least one electrically conductive connecting element is provided between the first structural element and the second structural element.

5. The distribution structure as claimed in claim 1, characterized in that the second structural element has a dimpled and/or grooved structure in order to produce an alternating contact area to a gas diffusion layer at the bottom of the feed channels.

6. The distribution structure as claimed in claim 1, characterized in that the feed channels are formed on a first side of the second structural element which faces the first structural element,
wherein the discharge channels are formed on a second side of the second structural element which is configured to face a gas diffusion layer.

7. The distribution structure as claimed in claim 1, further comprising at least one hole configured to have the reaction gas introduced therethrough essentially perpendicular to an extension plane of a gas diffusion layer into the gas diffusion layer, wherein the at least one hole is formed in the second structural element at the bottom of the feed channels.

8. The distribution structure as claimed in claim 1, characterized in that the feed channels have an increasing cross-sectional area in a direction of an introduction of reaction gas through the distribution area.

9. The distribution structure as claimed in claim 1, characterized in that, from one of the feed channels to an other of the feed channels, a number of holes which is variable or increases in a direction of an introduction of reaction gas through the distribution area is formed on the bottom of the feed channels.

10. A fuel cell comprising
an anode space and a cathode space, and
a distribution structure as claimed in claim 1 for supplying an oxygen-containing gas mixture to the cathode space.

11. An electrolyzer comprising
an anode space and a cathode space, and
a distribution structure as claimed in claim 1 for supplying an oxygen-containing gas mixture to the cathode space.

12. The distribution structure as claimed in claim 1, wherein the reaction gas is an oxygen-containing gas mixture.

13. The distribution structure as claimed in claim 1, characterized in that at least one electrically conductive, column-like connecting element is provided between the first structural element and the second structural element.

14. The distribution structure as claimed in claim 1, characterized in that, from one of the feed channels to an other of the feed channels, a plurality of holes which have different cross-sectional areas or cross-sectional areas which become larger in a direction of an introduction of reaction gas through the distribution area are formed on the bottom of the feed channels.

15. The distribution structure as claimed in claim 14, characterized in that, from the one of the feed channels to the other of the feed channels, a number of holes which is variable or increases in the direction of the introduction of the reaction gas through the distribution area is formed on the bottom of the feed channels.

16. The distribution structure as claimed in claim 2, wherein introduction of the at least one reaction gas defines a first direction, wherein the discharge channels are oriented in a second direction perpendicular to the first direction, and wherein the distribution area extends in the first direction and in the second direction and is parallel to the first structural element.

* * * * *